Patented Oct. 21, 1941

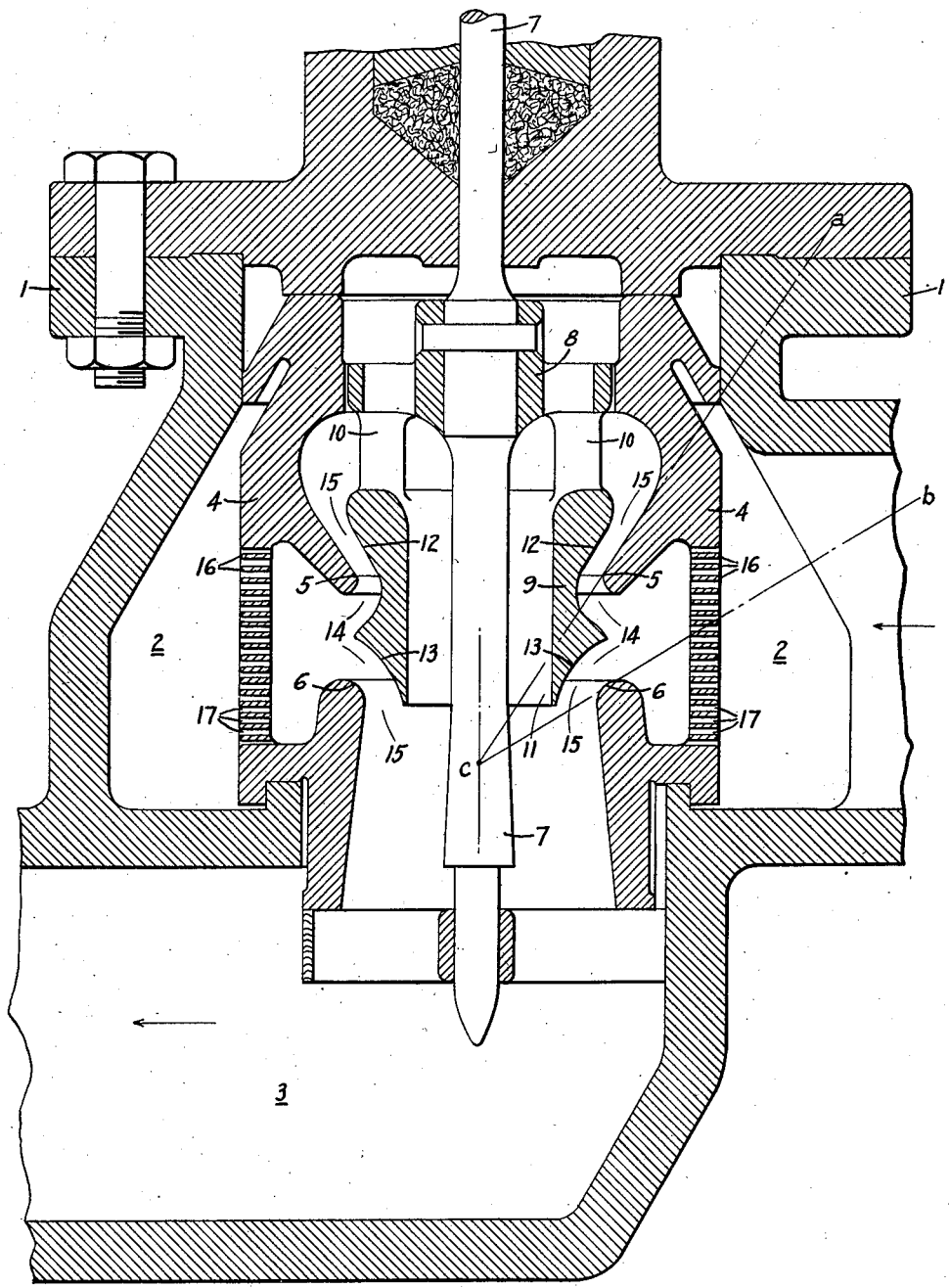

2,259,990

UNITED STATES PATENT OFFICE 2,259,990

VALVE

Karl Baumann, Wilmslow, England, assignor to General Electric Company, a corporation of New York Application February 24, 1940, Serial No. 320,697
In Great Britain February 22, 1939

2 Claims. (Cl. 251—81)

This invention relates to steam or elastic fluid valves of what is known as the balanced double-beat or double-seated type and has for its object to construct improved valves of this type in which the velocity of steam through the valve for a given pressure drop is increased so that the dimensions of the valve for the passage of a given weight of steam per hour are reduced.

According to the invention in order to attain this object the channels by which the steam approaches and recedes from the valve seats are made respectively convergent and divergent whereby when the valve is open the velocity of the steam in its passage towards the valve seats gradually increases and on leaving the valve seats diminishes so that the steam attains substantially its maximum velocity as it passes over the valve seats. By this means the valve seat diameter for the passage of a given weight of steam per hour for the same pressure drop can be made less than would be the case with a double-beat valve of the ordinary type.

In double-beat valves of existing well known types the outer cylindrical portion of the valve is usually connected to the boss through which the valve spindle passes by means of radial ribs which together with the boss obstruct the passage of the steam.

In valves according to the present invention the boss may be arranged outside the steam pass and the ribs connecting the movable portion of the valve to the boss arranged at the largest diameter possible, the steam flowing across them in a radial direction. Thus a large area can be provided and the velocity of the steam can be kept low in a part where the direction of the flow of steam changes. The ribs can conveniently be streamlined so as to reduce the pressure drop.

In such a construction the valve proper is free to expand symmetrically as a simple body and is not subject to distortions such as occur with the older type of valve.

In one construction the conical valve seats are ground so that the slant sides thereof will converge to a common apex in the center line of the valve whereby differential expansion which may occur in the valve seats and the valve itself does not affect the proper seating of the valve on both seats.

The improved valve seats may be connected by means of a hollow cylindrical member which locates the seats in the correct relative position. Said member is provided with small perforations through which the steam passes and thus acts as a strainer to prevent foreign matter passing through the valve. The seats may be either made in one piece with the cylindrical connecting portion so as to consist, for example, of a single casting, or the seats may be separate parts secured in the correct position at the ends of the cylindrical member.

The single figure of the accompanying drawing is a vertical sectional view of a valve constructed in accordance with the invention.

I is a casing having an annular entry passage 2 and an exit passage 3 for the steam. In a cavity in the casing between the entry and exit passage is secured a shell 4 which carries an upper valve seat 5 and a lower valve seat 6. The valve spindle 7 is provided with a boss 8 which carries the movable part 9 of the valve by means of depending ribs 10. The ribs may be streamlined in the direction of the steam flow. The movable part 9 of the valve which has a large central orifice 11 surrounding the spindle is formed externally with upper and lower valve seats 12 and 13 to cooperate with the fixed valve seats 5 and 6 respectively. As shown in the drawing the annular channels indicated at 14 by which the steam approaches the valve seats from the entry passage 2 are made convergent in the direction of the steam flow while those marked 15 by which the steam leaves the valve seats are made divergent in the direction of the steam flow so that the steam attains its maximum velocity as it passes over the valve seats. In the construction shown the valve seats are conical and ground so that the slant sides thereof, as indicated by the dash-dotted lines $a$, $b$, will converge to a common apex $c$, in the axis of the spindle 7. The fixed valve seats 5 and 6 are connected by a cylindrical member 16 forming part of the shell 4 which locates and maintains the seats 5 and 6 in their correct relative position. The member is provided with small perforations 17 to act as a strainer for the steam.

During operation elastic fluid is admitted from a conduit to the annular passage 2. With the valve in the open position, as indicated, the fluid passes through the perforations 17 of the shell towards the outlet 3, one portion of the fluid being conducted through the lower passages 14, 15 and another portion of the fluid through the upper passages 14, 15 formed by the adjacent portions of the part 9 and the valve seat 5. From the upper passage 15 the fluid flows radially inward through the spaces formed between adjacent depending ribs 10 towards the spindle 7 and then downward through the space formed between the spindle and the inner, cylindrical surface of the part 9. With the elements arranged and formed as described above, the fluid reaches its maximum velocity near the seats 5 and 6, that is, the velocity of the fluid increases until it reaches the seats 5 and then it decreases.

Valves of the improved construction are particularly suitable for use in turbine governing systems in which the valves are opened by oil-operated power pistons as the reduction of the out-of-balance force enables smaller operating gear to be employed and a greater sensitivity to be obtained, while the reduction obtainable in leakage with the valve closed is also important.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. A double-seated valve comprising a casing having an inlet and an outlet, a shell seated in the casing and defining an annular channel therewith communicating with the inlet, the shell having a cylindrical perforated portion acting as a strainer for conducting fluid from the channel to the outlet, other portions of the shell integral with and adjacent the opposite ends of the perforated portion forming valve seats and an end portion of the shell forming an opening communicating with the outlet, and a movable valve member in cooperative relation with the seats.

2. A double-seated valve comprising a casing having a detachable cover and forming an inlet and an outlet, a shell having a lower, an intermediate and an upper portion disposed within the casing, the lower portion engaging a seat formed by the casing and the upper portion being engaged by the cover and thereby retained in position, the shell with the casing forming an annular channel communicating with the inlet, the intermediate portion of the shell being perforated to act as a strainer for conducting fluid from the channel to the outlet, the lower and upper portions of the shell having concentric inward projections defining two axially spaced valve seats concentrically located within the strainer, and a cylinder type movable valve member within the shell in cooperative relation with the seats.

KARL BAUMANN.